US012774216B2

(12) United States Patent
Xu et al.

(10) Patent No.: US 12,774,216 B2
(45) Date of Patent: Oct. 27, 2026

(54) METHOD FOR PRODUCING HIGH PURITY COPPER SULFATE FROM SPENT ACIDIC COPPER CHLORIDE ETCHING SOLUTION

(71) Applicant: DONGJIANG ENVIRONMENTAL COMPANY LIMITED, Shenzhen (CN)

(72) Inventors: Wenbin Xu, Shenzhen (CN); Junqiang Zhu, Shenzhen (CN); Huiqian Wang, Shenzhen (CN); Long Chen, Shenzhen (CN); Zengmeng Yu, Shenzhen (CN); Zhibin Liu, Shenzhen (CN)

(73) Assignee: DONGJIANG ENVIRONMENTAL COMPANY LIMITED, Shenzhen (CN)

( * ) Notice: Subject to any disclaimer, the term of this patent is extended or adjusted under 35 U.S.C. 154(b) by 282 days.

(21) Appl. No.: 18/567,667

(22) PCT Filed: Dec. 31, 2021

(86) PCT No.: PCT/CN2021/143698
§ 371 (c)(1),
(2) Date: Dec. 6, 2023

(87) PCT Pub. No.: WO2023/123362
PCT Pub. Date: Jul. 6, 2023

(65) Prior Publication Data

US 2024/0343599 A1 Oct. 17, 2024

(51) Int. Cl.
*C01G 3/10* (2006.01)

(52) U.S. Cl.
CPC ............ *C01G 3/10* (2013.01); *C01P 2002/72* (2013.01); *C01P 2002/88* (2013.01); *C01P 2006/80* (2013.01)

(58) Field of Classification Search
CPC .... C01G 3/10; C01P 2002/72; C01P 2002/88; C01P 2006/80; C23F 1/46
See application file for complete search history.

(56) References Cited

FOREIGN PATENT DOCUMENTS

| | | |
|---|---|---|
| CN | 101899665 A | 12/2010 |
| CN | 106976902 A | 7/2017 |

(Continued)

OTHER PUBLICATIONS

International Search Report of PCT# CN2021/143698.
Written Opinion of PCT# CN2021/143698.

*Primary Examiner* — Daniel Berns
*Assistant Examiner* — Jaanzeb C Raja

(57) ABSTRACT

The present disclosure relates to the fields of chemical engineering and environmental protection, and in particular to a method of preparing high purity copper sulfate by using an acidic copper chloride etching waste liquid, which includes: introducing liquid ammonia into a first acidic copper chloride etching solution and a second acidic copper chloride etching solution, mixing the obtained solutions and allowing the mixture to be subjected to crystallization and filtration to produce an intermediate copper oxychloride; washing and separating copper oxychloride and adding it into a sulfuric acid solution to obtain a copper sulfate slurry, and then adding water to the copper sulfate slurry and performing cooling, crystallization and separation to obtain Semi-finished copper sulfate; adding a first solution to Semi-finished copper sulfate and then performing heating, and temperature-controlled filtration, and performing cooling, crystallization and centrifugation on an obtained first filtrate so as to obtain a high purity copper sulfate.

10 Claims, 4 Drawing Sheets

(56) References Cited

FOREIGN PATENT DOCUMENTS

| | | | | | |
|---|---|---|---|---|---|
| CN | 108249472 | A | | 7/2018 | |
| CN | 108341424 | A | * | 7/2018 | ............... C01G 3/10 |
| WO | 2008139021 | A1 | | 11/2008 | |

* cited by examiner

METHOD FOR PRODUCING HIGH PURITY COPPER SULFATE FROM SPENT ACIDIC COPPER CHLORIDE ETCHING SOLUTION

CROSS-REFERENCE TO RELATED APPLICATION

This Application is a national stage application of PCT/CN2021/143698. This application claims priority from PCT Application No. PCT/CN2021/143698, filed Dec. 31, 2021, the content of which is incorporated herein in the entirety by reference.

TECHNICAL FIELD

The present disclosure relates to the fields of chemical engineering and environmental protection, and in particular to a method of preparing high purity copper sulfate by using an acidic copper chloride etching waste liquid.

BACKGROUND

The printed circuit board (PCB) etching solution includes an acidic etching solution and an alkaline etching solution. Under the influences of increasingly stringent safety and environmental protection requirements, cost control, and etching process innovation, the ratio of the acidic etching solution is on a stable increase. Therefore, an acidic copper chloride etching waste liquid produced in the PCB industry has an increasing ratio. The existing treatment technology has the problems of high production cost, low product added value secondary pollution, etc., and thus cannot satisfy the requirements under the latest situations.

For the above problems, at present, a Chinese patent with the publication number CN106587105B discloses a method of recovering an acidic copper chloride etching waste liquid in a printed circuit board, in which the key points of the technical scheme are as follows: after sodium chloride is added to a waste liquid, hydrochloric acid is obtained by distillation and sodium chloride is obtained by crystallization and finally elemental copper is obtained by electrolysis. However, the patent has the following disadvantages: (1) low concentration of byproduct hydrochloric acid and small application scope; (2) the sodium chloride product contains multiple impurities such as heavy metal and ammonium and the like, which are defined as dangerous wastes at the risk of posing secondary pollution; (3) lack of removal of impurities in the preparation of the elemental copper, leading to low quality of the elemental copper.

Furthermore, a Chinese patent with the publication number CN112593233B also discloses a method of recovering an acidic copper chloride etching waste liquid in a printed circuit board, in which the key points of the technical scheme are as follows: an alkaline etching waste liquid and an acidic etching waste liquid are mixed for reaction to obtain copper oxychloride; copper oxychloride is then added to sulfuric acid to produce copper sulfate; finally, an agent is added to recover $NH4^{+}$ in the form of magnesium ammonium phosphate precipitate in a mother liquor. The method also has the following disadvantages: (1) lack of removal of the impurities in the preparation of copper sulfate, leading to failure to ensure the product quality of copper sulfate; (2) high treatment cost of wastewater; (3) due to high content of $NH_4^+$ residues in the mother liquor, the wastewater needs to be further treated subsequently.

SUMMARY

In order to address the above shortcomings of the prior arts, the present disclosure provides a method of preparing high purity copper sulfate by using an acidic copper chloride etching waste liquid, so as to obtain high purity copper sulfate, thus achieving full resource utilization of each component in the waste liquid.

The above technical object of the present disclosure is achieved by the following technical scheme. There is provided a method of preparing high purity copper sulfate by using an acidic copper chloride etching waste liquid, which includes the following steps:

(1) providing a first acidic copper chloride etching solution and introducing liquid ammonia into the first acidic copper chloride etching solution for reaction and filtration to obtain a copper-containing refined liquid;

(2) providing a second acidic copper chloride etching solution, and adjusting, by using the liquid ammonia, a pH value of the second acidic copper chloride etching solution to 0 to 2.5 to obtain an acidity-adjusted second acidic copper chloride etching solution;

(3) performing a reaction with the copper-containing refined liquid and the acidity-adjusted second acidic copper chloride etching solution as raw materials, controlling a crystallization process to obtain copper oxychloride, and performing filtration on copper oxychloride;

(4) washing copper oxychloride and performing solid-liquid separation on copper oxychloride to obtain washed copper oxychloride;

(5) adding the washed copper oxychloride to a sulfuric acid solution for reaction to obtain a copper sulfate slurry and hydrochloric acid, adding water to the copper sulfate slurry, and performing cooling crystallization and solid-liquid separation to obtain Semi-finished copper sulfate;

(6) adding a first solution to Semi-finished copper sulfate, performing heating dissolution and temperature-controlled filtration to obtain a first filtrate, and performing cooling crystallization and centrifugation on the first filtrate to obtain high purity copper sulfate.

In one example, the liquid ammonia is of industrial level with a content above 99.0%.

In one example, in the step (1), a pH value of the first acidic copper chloride etching solution at a reaction end-point is 8.0 to 9.6.

In one example, in the step (3), a temperature in a process of preparing copper oxychloride is 10° C. to 100.0° C.

In one example, in the step (3), a pH value in a process of preparing copper oxychloride is 3.0 to 7.0.

In one example, copper oxychloride is washed two times with a washing water amount being 1.0 to 5.0 times a mass of copper oxychloride.

In one example, the sulfuric acid solution is a mixture of concentrated sulfuric acid or sulfuric acid and copper sulfate, and a concentration of sulfuric acid is 25.0% to 98.0%.

In one example, a mass ratio of copper oxychloride to the highly-concentrated sulfuric acid (by sulfuric acid content) is 0.75:1 to 1.4:1.

In one example, the first solution is water or a copper sulfate mother liquor.

In one example, in the step (6), a temperature for performing temperature-controlled filtration on Semi-finished copper sulfate is 80.0° C. to 100.0° C.

The method of preparing high purity copper sulfate by using an acidic copper chloride etching waste liquid has the following beneficial effects.

Firstly, with liquid ammonia as raw material, energy saving, fewer impurities, and low cost can be achieved: in the steps (1) and (2), with the use of liquid ammonia, no additional water evaporation occurs in the patented process: due to high purity of liquid ammonia, introduction of impurities will be reduced from the source.

Secondly, the byproduct hydrochloric acid has a high concentration and high added value: in the step (5), the concentration of hydrochloric acid prepared by controlling acid conversion using copper oxychloride reaches above 31.0%, satisfying the industrial product requirements.

Thirdly, with step-by-step impurity removal and quality control, the copper sulfate product has high quality; with pre-reaction in the step (1), the crystallization control of copper oxychloride in the step (3), acid conversion in the step (5), and crystallization in the step (6), multiple steps are performed to achieve impurity removal and control so as to obtain a copper sulfate product with high quality.

BRIEF DESCRIPTIONS OF THE DRAWINGS

DETAILED DESCRIPTIONS OF EMBODIMENTS

The present disclosure will be detailed below in combination with drawings and specific examples.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and does not indicate or imply that the indicated devices or elements must have a particular orientation, or be constructed or operated in a particular orientation. Therefore, such terms shall not be understood as limiting of the present disclosure.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present disclosure, "several" refers to at least two, for example, two or three or the like, unless otherwise clearly stated.

In the present disclosure, unless otherwise clearly stated or defined, the terms "mount", "connect", "couple", and "fix" and the like shall be understood in a broad sense, for example, may be fixed connection, or detachable connection, or formed into one piece: or may be mechanical connection, or electrical connection: or direct connection or indirect connection through an intermediate medium, or may be internal communication between two elements or mutual interaction of two elements, unless otherwise stated. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

Figure 1:
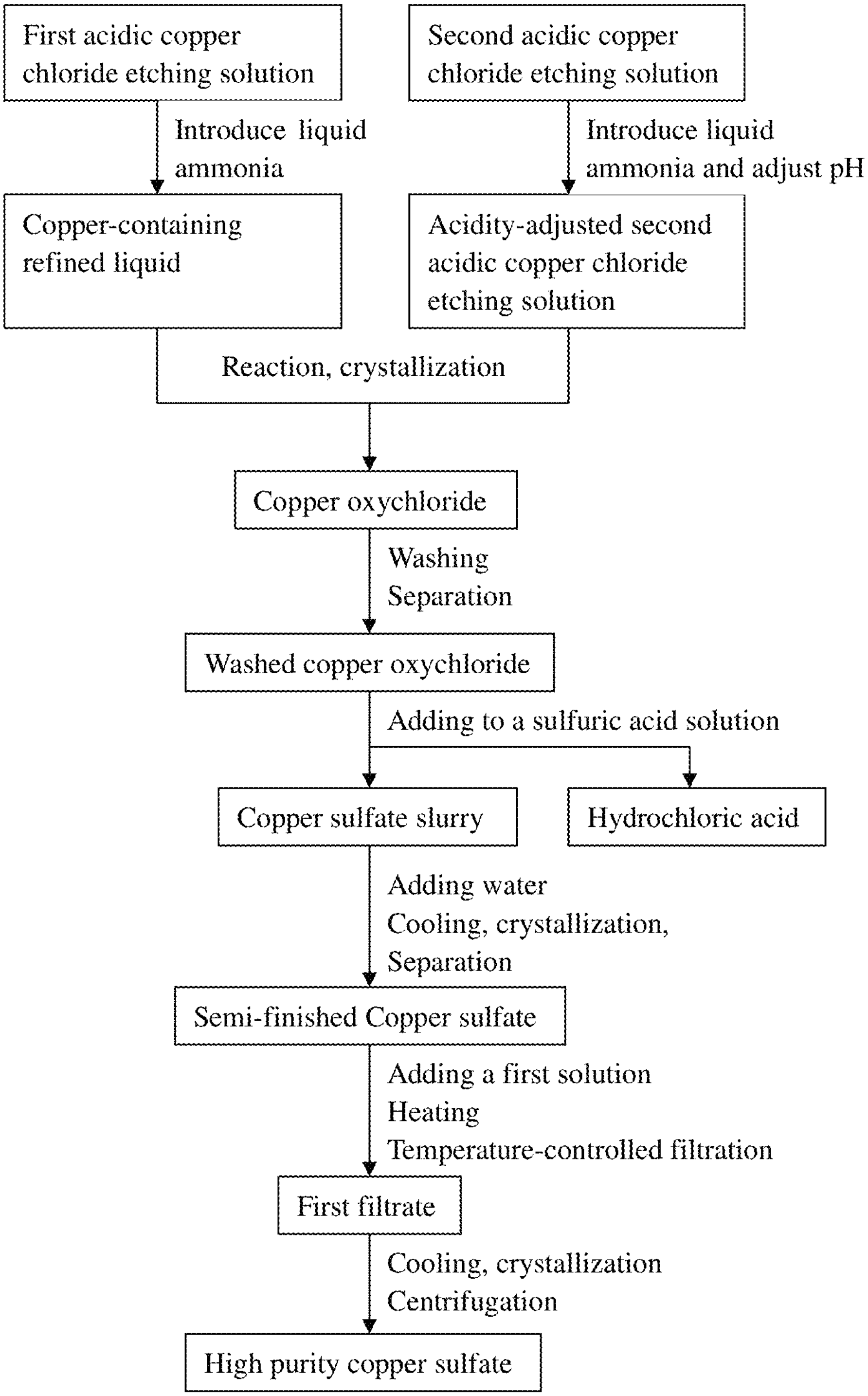
FIG. 1 is a flowchart of the present disclosure.
Figure 2:
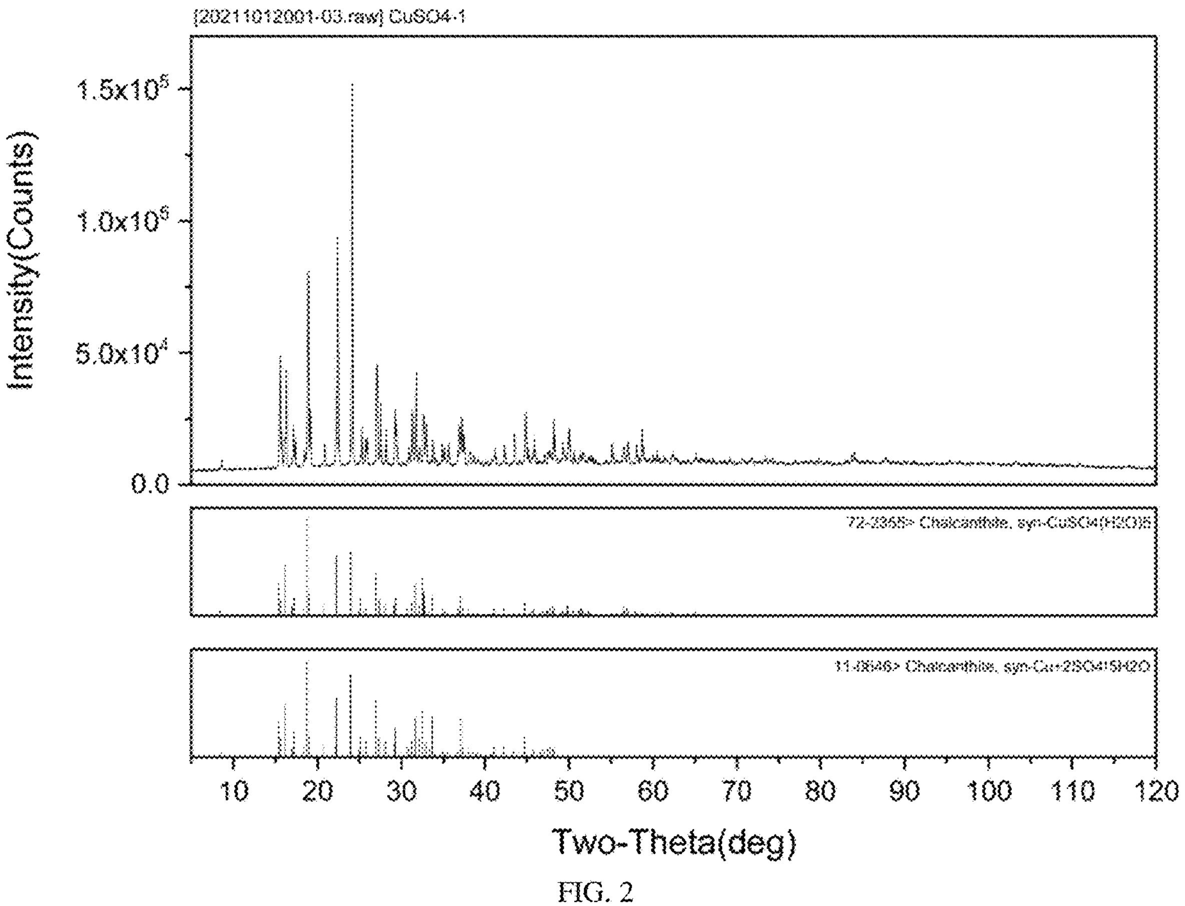
FIG. 2 is an XRD comparison graph of a copper sulfate product prepared in an example 1 of the present disclosure.
Figure 3:
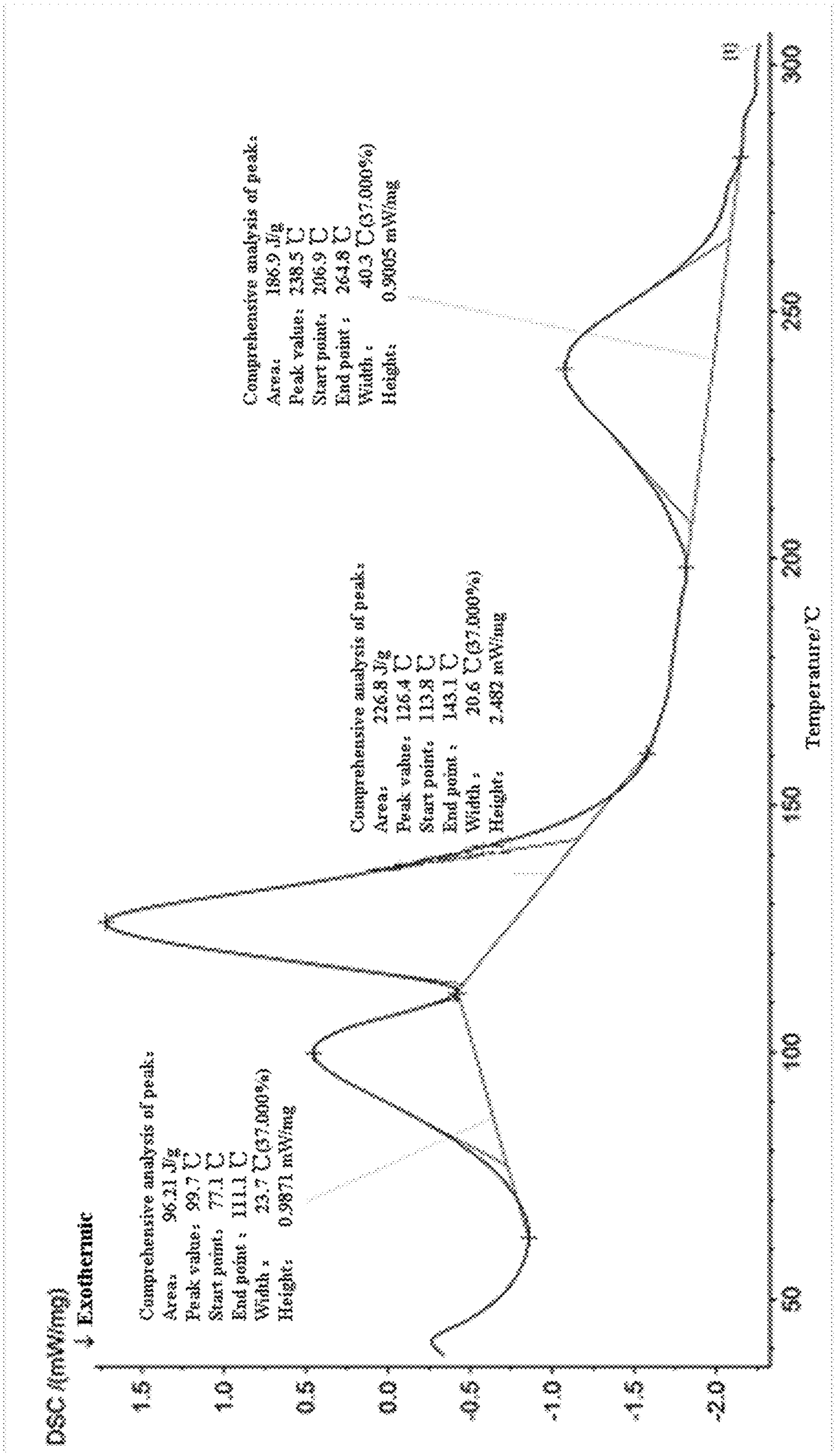
FIG. 3 is a thermogravimetric analysis graph-N2 atmosphere (DSC) of a copper sulfate product prepared in an example 1 of the present disclosure.
Figure 4:
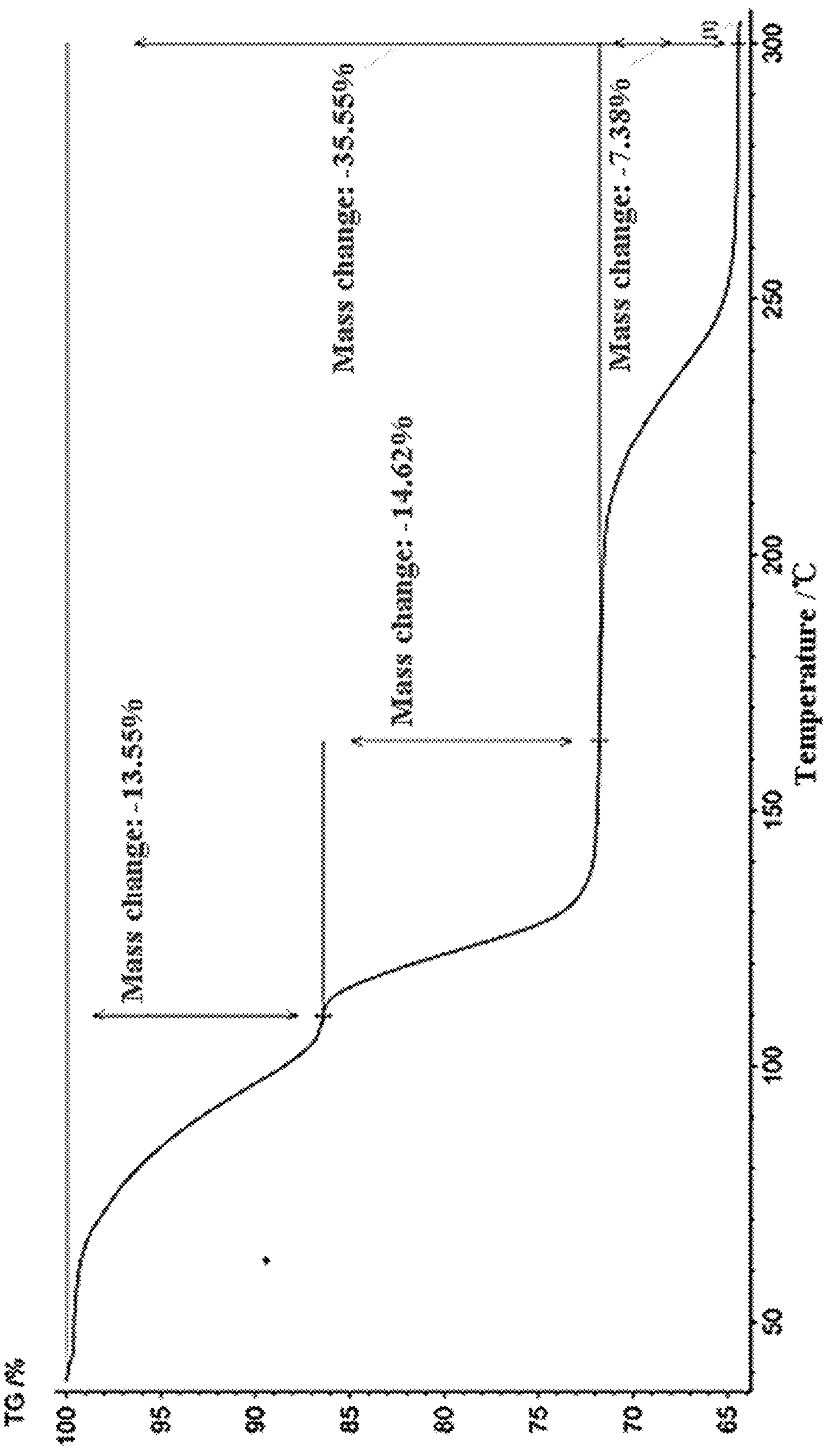
FIG. 4 is a thermogravimetric analysis graph-N2 atmosphere (TG) of a copper sulfate product prepared in an example 1 of the present disclosure.

As shown in FIG. 1, there is provided a method of preparing high purity copper sulfate by using an acidic copper chloride etching waste liquid, which includes the following steps.

(1) A first acidic copper chloride etching solution is provided and liquid ammonia is introduced into the first acidic copper chloride etching solution for reaction and filtration to obtain a copper-containing refined liquid.

(2) A second acidic copper chloride etching solution is provided, and a pH value of the second acidic copper chloride etching solution is adjusted, by using the liquid ammonia, to 0 to 2.5 to obtain an acidity-adjusted second acidic copper chloride etching solution.

(3) Reaction is performed with the copper-containing refined liquid and the acidity-adjusted second acidic copper chloride etching solution as raw materials, a crystallization process is controlled to obtain copper oxychloride, and then filtration is performed on copper oxychloride.

Specifically, the filtrate is subjected to copper extraction, impurity removal, evaporation concentration, and salt separation crystallization to produce industrial ammonium chloride and industrial sodium chloride, where a cooling energy required for cooling ammonium chloride and sodium chloride is carried away by the liquid ammonia in step (1).

(4) Copper oxychloride is washed and solid-liquid separation is performed on copper oxychloride to obtain washed copper oxychloride.

(5) The washed copper oxychloride is added to a sulfuric acid solution for reaction to obtain a copper sulfate slurry and hydrochloric acid, water is added to the copper sulfate slurry, and then cooling crystallization and solid-liquid separation are performed to obtain Semi-finished copper sulfate.

Specifically, the crystallization mother liquor can replace a part of the sulfuric acid solution for acid conversion of copper oxychloride and also can serve as a back extractant for extracting a copper-loaded organic phase in step (3).

(6) A first solution is added to Semi-finished copper sulfate, and heating dissolution and temperature-controlled filtration are performed to obtain a first filtrate, and cooling crystallization and centrifugation are performed on the first filtrate to obtain high purity copper sulfate.

The method of preparing high purity copper sulfate by using an acidic copper chloride etching waste liquid has the following beneficial effects.

Firstly, with liquid ammonia as raw material, energy saving, fewer impurities, and low cost can be achieved: in the steps (1) and (2), with the use of liquid ammonia, no additional water evaporation occurs in the patented process: due to high purity of liquid ammonia, introduction of impurities will be reduced from the source.

Secondly, the byproduct hydrochloric acid has a high concentration and high added value: in the step (5), the concentration of hydrochloric acid prepared by controlling acid conversion using copper oxychloride reaches above 31.0%, satisfying the industrial product requirements.

Thirdly, with step-by-step impurity removal and quality control, the copper sulfate product has high quality; with the pre-reaction in the step (1), the crystallization control of copper oxychloride in the step (3), acid conversion in the step (5), and crystallization in the step (6), multiple steps are performed to achieve impurity removal and control so as to obtain a copper sulfate product with high quality.

Preferably, liquid ammonia is of industrial level, with a content above 99.0%.

Preferably, in the step (1), a pH value of the first acidic copper chloride etching solution at a reaction endpoint is 8.0 to 9.6.

Preferably, in the step (3), a temperature in a process of preparing copper oxychloride is 10° C. to 100.0° C.

Preferably, in the step (3), a pH value in a process of preparing copper oxychloride is 3.0 to 7.0.

Preferably, copper oxychloride is washed two times with a washing water amount being 1.0 to 5.0 times a mass of copper oxychloride.

The sulfuric acid solution is a mixture of concentrated sulfuric acid or sulfuric acid and copper sulfate, and a concentration of sulfuric acid is 25.0% to 98.0%.

Preferably, a mass ratio of copper oxychloride to the highly-concentrated sulfuric acid (by sulfuric acid content) is 0.75:1 to 1.4:1.

The first solution is preferably water or a copper sulfate mother liquor.

Preferably, in the step (6), a temperature for performing temperature-controlled filtration on Semi-finished copper sulfate is 80.0° C. to 100.0° C.

Specific examples are illustrated below.

Example 1

A circuit board factory provided a typical acidic copper chloride etching waste liquid A as a treatment object, with the following major components: copper 10.06%, chlorine 21.88%, free hydrochloric acid 7.46%, sodium 2.18%, iron 10.85 $mg \cdot kg^{-1}$, lead 2.19 $mg \cdot kg^{-1}$ and calcium 15.19 $mg \cdot kg^{-1}$.

Cylindered liquid ammonia with a content of 99.8% was depressurized by a pressure release valve and then introduced through a tube into 330.0 ml of the first acidic copper chloride etching solution A. When the system pH value was 9.1, the pressure release valve of the liquid ammonia was turned off, and the reaction was continued for 5.0 min and then filtration was performed to collect a filtrate, so as to obtain a copper-containing refined liquid B.

By using the cylindered liquid ammonia with a content of 99.8%, a free acid of 500.0 ml of the second acidic copper chloride etching solution C was adjusted. When the system pH value decreased to 0.5, the introduction of the liquid ammonia was stopped, and filtration was performed to collect a filtrate so as to obtain an acidity-adjusted second acidic copper chloride etching solution D.

The copper-containing refined liquid B and the acidity-adjusted second acidic copper chloride etching solution D were added by flow addition as raw materials into a 1000.00 ml four-mouth flash with stirring function while pH was controlled to 5.4 and the reaction temperature was controlled to around 87.0° C. After the materials were added, the reaction was continued for 10.0 min and then filtration was performed to obtain 176.7 g of copper oxychloride with a water content of 5.5%.

The filtrate was subjected to llx984 copper extraction, impurity removal, evaporation concentration, and salt separation crystallization to produce industrial ammonium chloride and industrial sodium chloride, where a cooling energy required for cooling ammonium chloride and sodium chloride was carried away by vaporization of the liquid ammonia in the process of pre-reaction and acidity adjustment.

Copper oxychloride was washed two times by using 220.0 g of clean water to obtain 176.1 g of copper oxychloride.

176.1 g of washed copper oxychloride was added to 290.0 g of sulfuric acid solution with a sulfuric acid content of 70.0%, and a copper sulfate slurry and 97.5 g of 31.0% hydrochloric acid were respectively obtained by distillation during a stirring process; finally, 50.0 ml of water was replenished to the copper sulfate slurry, and then cooling crystallization and suction filtration were performed to obtain 398.2 g of Semi-finished copper sulfate.

The crystallization mother liquor can replace a part of sulfuric acid for acid conversion of copper oxychloride and also can serve as a back extractant for extracting a copper-loaded organic phase in step (3).

A proper amount of water was added and heated to dissolve the Semi-finished copper sulfate and then solid-liquid separation was performed to obtain a first filtrate. The first filtrate was cooled and crystallized and then centrifuged to obtain 390.2 g of high purity copper sulfate.

Through detection, the major indexes of the copper sulfate product were obtained as follows:

$CuSO_4 \cdot 5H_2O$ 98.6%, As undetected, Pb 5.3 $mg \cdot kg^{-1}$, Ca 10.0 $mg \cdot kg^{-1}$, Fe 10.0 $mg \cdot kg^{-1}$, Co 0.31 $mg \cdot kg^{-1}$, Ni 2.7 $mg \cdot kg^{-1}$, Zn 6.8 $mg \cdot kg^{-1}$, Cl 15.0 $mg \cdot kg^{-1}$.

Example 2

A circuit board factory provided a typical acidic copper chloride etching waste liquid as a treatment object, with the following major components: copper 10.18%, chlorine 21.08%, free hydrochloric acid 7.52%, sodium 1.55%, $NH_3$—N 27.65 $mg \cdot kg^{-1}$, iron 1.24 $mg \cdot kg^{-1}$, lead 4.16 $mg \cdot kg^{-1}$, and calcium 1.62 $mg \cdot kg^{-1}$.

Cylindered liquid ammonia with a content of 99.8% was depressurized by a pressure release valve and then introduced through a tube into 320.0 ml of the first acidic copper chloride etching solution A. When the system pH value was 9.5, the pressure release valve of the liquid ammonia was turned off, and the reaction was continued for 35.0 min and then filtration was performed to collect a filtrate, so as to obtain a copper-containing refined liquid B.

By using the cylindered liquid ammonia with a content of 99.8%, a free acid of 650.0 ml of the second acidic copper chloride etching solution C was adjusted. When the system pH value decreased to 2.0, the introduction of the liquid ammonia was stopped, and filtration was performed to collect a filtrate so as to obtain an acidity-adjusted second acidic copper chloride etching solution D.

The copper-containing refined liquid B and the acidity-adjusted second acidic copper chloride etching solution D were added by flow addition as raw materials into a 1000.00 ml four-mouth flash with stirring function while pH was controlled to 4.8 and the reaction temperature was controlled to around 95.0° C. After the materials were added, the reaction was continued for 10.0 min and then filtration was performed to obtain 182.7 g of copper oxychloride with a water content of 3.7%.

The filtrate was subjected to lIx984 copper extraction, impurity removal, evaporation concentration, and salt separation crystallization to produce industrial ammonium chloride and industrial sodium chloride: the crystallization mother liquor for extracting the copper-loaded organic phase after acid conversion of copper oxychloride performs back extraction.

Copper oxychloride was washed and filtered by using 400.0 g of water and then washed and filtered once by using 180.0 g of clean water to obtain 182.0 g of copper oxychloride.

182.0 g of washed refined copper oxychloride was added to 602.0 g of a sulfuric acid back-extraction solution with the sulfuric acid content of 30.0%. A copper sulfate slurry and 97.0 g of 31.0% hydrochloric acid were respectively obtained by distillation during a stirring process; finally, 75.0 ml of water was replenished to the distilled copper sulfate slurry, and then cooling crystallization and suction filtration were performed to obtain 481.6 g of Semi-finished copper sulfate.

A proper amount of water was added and heated to dissolve the Semi-finished copper sulfate and then solid-liquid separation was performed to obtain a first filtrate. The first filtrate was cooled and crystallized and then centrifuged to obtain 475.0 g of high purity copper sulfate.

Through detection, the major indexes of the copper sulfate product were obtained as follows:

$CuSO_4 \cdot 5H_2O$ 98.7%, As undetected, Pb 4.0 $mg \cdot kg^{-1}$, Ca 6.5 $mg \cdot kg^{-1}$, Fe 16.0 $mg \cdot kg^{-1}$, Co 1.3 $mg \cdot kg^{-1}$, Ni 2.6 $mg \cdot kg^{-1}$, Zn 7.1 $mg \cdot kg^{-1}$, Cl 16.0 $mg \cdot kg^{-1}$.

Example 3

A circuit board factory provided a typical acidic copper chloride etching waste liquid A as a treatment object, with the following major components: copper 10.31%, chlorine 21.85%, free hydrochloric acid 6.68%, sodium 2.48%, $NH_3$—N 0.44%, iron 6.42 $mg \cdot kg^{-1}$, lead 3.95 $mg \cdot kg^{-1}$, and calcium 15.42 $mg \cdot kg^{-1}$.

Cylindered liquid ammonia with a content of 99.8% was depressurized by a pressure release valve and then introduced through a tube into 270.0 ml of the first acidic copper chloride etching solution A. When the system pH value was 9.5, the pressure release valve of the liquid ammonia was turned off, and the reaction was continued for 5.0 min and then filtration was performed to collect a filtrate, so as to obtain a copper-containing refined liquid B.

By using the cylindered liquid ammonia with a content of 99.8%, a free acid of 550.0 ml of the second acidic copper chloride etching solution C was adjusted. When the system pH value decreased to 0.9, the introduction of the liquid ammonia was stopped, and filtration was performed to collect a filtrate so as to obtain an acidity-adjusted second acidic copper chloride etching solution D.

The copper-containing refined liquid B and the acidity-adjusted second acidic copper chloride etching solution D were added by flow addition as raw materials into a 1000.00 ml four-mouth flash with stirring function while pH was controlled to 3.3 and the reaction temperature was controlled to around 78.0° C. After the materials were added, the reaction was continued for 10.0 min and then filtration was performed to obtain 147.0 g of copper oxychloride with a water content of 7.5%.

The filtrate was subjected to lIx984 copper extraction, impurity removal, evaporation concentration, and salt separation crystallization to produce industrial ammonium chloride and industrial sodium chloride, where a cooling energy required for cooling ammonium chloride and sodium chloride was carried away by vaporization of the liquid ammonia in the process of pre-reaction and acidity adjustment.

Copper oxychloride was washed two times by using 120.0 g of clean water to obtain 146.2 g of copper oxychloride.

146.2 g of washed copper oxychloride was added to a mixed solution of 125.0 g of concentrated sulfuric acid and 85.0 g of crystallization mother liquor with the sulfuric acid content of 26.0% and copper content of 2.3%: a copper sulfate slurry and 70.5 g of 31.0% hydrochloric acid were respectively obtained by distillation during a stirring process; finally, 30.0 ml of water was replenished to the copper sulfate slurry, and then cooling crystallization and suction filtration were performed to obtain 327.8 g of Semi-finished copper sulfate.

A proper amount of copper sulfate mother liquor was added and heated to dissolve the Semi-finished copper sulfate and then solid-liquid separation is performed to obtain a first filtrate. The first filtrate was cooled and crystallized and then centrifuged to obtain 429.0 g of high purity copper sulfate.

Through detection, the major indexes of the copper sulfate product were obtained as follows:

$CuSO_4 \cdot 5H_2O$98.7%, As undetected, Pb2.6 $mg \cdot kg^{-1}$, Ca10.0 $mg \cdot kg^{-1}$, Fe35 $mg \cdot kg^{-1}$, Co 1.6 $mg \cdot kg^{-1}$, Ni2.3 $mg \cdot kg^{-1}$, Zn10.0 $mg \cdot kg^{-1}$ and C110.5 $mg \cdot kg^{-1}$.

The above examples are only illustrative and used to interpret some features of the method of the present disclosure. The appended claims are intended to claim a scope conceived of as widely as possible, and the examples mentioned in the present disclosure are those in which true test results of the applicant are demonstrated. Therefore, the applicant desires that the appended claims are not limited by the selection of the examples describing the features of the present disclosure. Some numerical ranges used in the claims also include sub-ranges within them and the changes of these ranges shall also be, in possible cases, interpreted as covered by the appended claims.

What is claimed is:

1. A method of preparing high purity copper sulfate by using an acidic copper chloride etching waste liquid, comprising the steps of:

(1) providing a first acidic copper chloride etching solution and introducing liquid ammonia into the first acidic copper chloride etching solution for reaction and filtration to obtain a copper-containing refined liquid;

(2) providing a second acidic copper chloride etching solution, and adjusting, by using the liquid ammonia, a pH value of the second acidic copper chloride etching solution to 0 to 2.5 to obtain an acidity-adjusted second acidic copper chloride etching solution;

(3) performing a reaction with the copper-containing refined liquid and the acidity-adjusted second acidic copper chloride etching solution as raw materials, controlling a crystallization process to obtain copper oxychloride, and performing filtration on copper oxychloride;

(4) washing copper oxychloride and performing solid-liquid separation on copper oxychloride to obtain washed copper oxychloride;

(5) adding the washed copper oxychloride to a sulfuric acid solution for reaction to obtain a copper sulfate slurry and hydrochloric acid, adding water to the copper sulfate slurry, and performing cooling crystallization and solid-liquid separation to obtain Semi-finished copper sulfate;

(6) adding a first solution to Semi-finished copper sulfate, and performing heating dissolution and temperature-controlled filtration to obtain a first filtrate, and performing cooling crystallization and centrifugation on the first filtrate to obtain high purity copper sulfate.

2. The method of claim 1, wherein the liquid ammonia is of industrial level with a content above 99.0%.

3. The method of claim 1, wherein, in the step (1), a pH value of the first acidic copper chloride etching solution at a reaction endpoint is 8.0 to 9.6.

4. The method of claim 1, wherein, in the step (3), a temperature in a process of preparing copper oxychloride is 10° C. to 100.0° C.

5. The method of claim 1, wherein, in the step (3), a pH value in a process of preparing copper oxychloride is 3.0 to 7.0.

6. The method of claim 1, wherein, copper oxychloride is washed two times with a washing water amount being 1.0 to 5.0 times a mass of copper oxychloride.

7. The method of claim 1, wherein, the sulfuric acid solution is a mixture of concentrated sulfuric acid or sulfuric acid and copper sulfate, and a concentration of sulfuric acid is 25.0% to 98.0%.

8. The method of claim 1, wherein, a mass ratio of copper oxychloride to the sulfuric acid solution (by sulfuric acid content) is 0.75:1 to 1.4:1.

9. The method of claim 1, wherein the first solution is water or a copper sulfate mother liquor.

10. The method of claim 1, wherein in the step (6), a temperature for performing temperature-controlled filtration on Semi-finished copper sulfate is 80.0° C. to 100.0° C.

* * * * *